(12) United States Patent
Yuyama

(10) Patent No.: US 8,047,352 B2
(45) Date of Patent: Nov. 1, 2011

(54) VIAL SUPPLY DEVICE

(75) Inventor: Shoji Yuyama, Toyonaka (JP)

(73) Assignee: Yuyama Mfg. Co., Ltd., Osaka (JP)

( * ) Notice: Subject to any disclaimer, the term of this patent is extended or adjusted under 35 U.S.C. 154(b) by 397 days.

(21) Appl. No.: 12/300,452

(22) PCT Filed: Apr. 26, 2007

(86) PCT No.: PCT/JP2007/059068
§ 371 (c)(1),
(2), (4) Date: Nov. 11, 2008

(87) PCT Pub. No.: WO2007/132663
PCT Pub. Date: Nov. 22, 2007

(65) Prior Publication Data
US 2009/0101474 A1 Apr. 23, 2009

(30) Foreign Application Priority Data

May 11, 2006 (JP) .................................. 2006-132491

(51) Int. Cl.
*B65B 43/52* (2006.01)
*B65G 65/42* (2006.01)

(52) U.S. Cl. .......................... 198/413; 198/435; 198/607

(58) Field of Classification Search .................. 198/407, 198/412, 413, 435, 457.03, 529, 575, 607, 198/809
See application file for complete search history.

(56) References Cited

U.S. PATENT DOCUMENTS 4,027,458 A * 6/1977 Goodman .......................... 53/55
4,036,355 A * 7/1977 Valli ............................. 198/607
5,271,489 A * 12/1993 Helmstetter ............... 198/347.1
5,415,280 A * 5/1995 Balboni et al. ................ 198/435
5,543,699 A * 8/1996 Schoeneck ..................... 318/616
6,119,737 A * 9/2000 Yuyama et al. ............... 141/104

(Continued)

FOREIGN PATENT DOCUMENTS

JP 52-36483 3/1977

(Continued)

OTHER PUBLICATIONS

PCT International Search Report for PCT/JP2007/059068, in English and Japanese, 5 pages (mailed Jul. 17, 2007).

(Continued)

*Primary Examiner* — Douglas Hess
(74) *Attorney, Agent, or Firm* — Jones Day; Christopher C. Bolten

(57) ABSTRACT

A vial supply device 11 having a receiving section with a large capacity and capable of reliably discharging the vials includes: a receiving section 101 for receiving many empty vials 4; a conveyance unit 105 having a horizontal endless member 104 located at a bottom wall of the receiving section 101 and being configured to be driven in a horizontal direction, the conveyance unit being further configured to convey the vials 4 in a horizontal direction by using the horizontal endless member 104; and a discharge unit 111 having a vertical endless member 109 located at a wall of the receiving section 101 and being configured to be driven in a vertical direction, the discharge unit being further configured to lift the vials 4 upward and discharge the same while allowing the vials 4 to be horizontally supported at support members 110 located at the vertical endless member 109 at predetermined intervals.

20 Claims, 10 Drawing Sheets

U.S. PATENT DOCUMENTS

| | | | |
|---|---|---|---|
| 6,227,848 B1 * | 5/2001 | Imai | 432/121 |
| 6,478,185 B2 | 11/2002 | Kodama et al. | |
| 7,100,796 B1 * | 9/2006 | Orr et al. | 221/191 |
| 7,831,334 B2 * | 11/2010 | Vollm et al. | 700/231 |
| 7,861,492 B2 * | 1/2011 | Yuyama et al. | 53/53 |

FOREIGN PATENT DOCUMENTS

| | | |
|---|---|---|
| JP | 10-194433 | 7/1998 |
| JP | 11-070901 | 3/1999 |
| JP | 2002-29511 | 1/2002 |

OTHER PUBLICATIONS

PCT Written Opinion of the International Searching Authority for PCT/JP2007/059068, in Japanese, 3 pages (mailed Jul. 17, 2007).

* cited by examiner

US 8,047,352 B2

VIAL SUPPLY DEVICE

CROSS-REFERENCE TO RELATED APPLICATIONS

This application is a 35 U.S.C. §371 U.S. National Stage filing of International Application No. PCT/JP2007/059068, filed under the Patent Cooperation Treaty on Apr. 26, 2007, and claims priority under 35 U.S.C. §119 to Japanese Patent Application No. 2006-132491, filed May 11, 2006, both of which are incorporated herein by reference in their entireties.

TECHNICAL FIELD

The present invention relates to a vial supply device for filling tablets in a vial as prescribed.

BACKGROUND ART

Japanese Laid-Open Patent Publication No. (Hei) 11-070901 discloses a vial supply device. In such a device, the bottom of a receiving section, which is adapted to receive many empty vials, is tilted so as to move and lift a vial upward for discharge to the outside (see FIG. 8).

SUMMARY OF THE INVENTION

As mentioned above, the bottom of a receiving section of a conventional vial supply device is formed to be tilted. As such, the capacity of the receiving section is relatively small.

Thus, the object of the present invention is to provide a vial supply device having a receiving section with a large capacity and being capable of reliably discharging the empty vials.

In this respect, the present invention is directed to a vial supply device for receiving many empty vials and supplying them to a tablet filling section one at a time. The vial supply device of the present invention comprises the following elements: a receiving section for receiving many empty vials; a conveyance unit having a horizontal endless member located at a bottom wall of the receiving section and being configured to be driven in a horizontal direction, the conveyance unit being further configured to convey the vials in a horizontal direction by using the horizontal endless member; and a discharge unit having a vertical endless member located at a wall of the receiving section and being configured to be driven in a vertical direction, the discharge unit being further configured to lift the vials upward and discharge the same while allowing the vials to be horizontally supported at support members located at the vertical endless member at predetermined intervals. A conveyance end section of the conveyance unit and a conveyance start section of the discharge unit are positioned to be close to each other.

When the conveyance unit and the discharge unit are driven, the vials received by the receiving section are horizontally conveyed toward the discharge unit by using the conveyance unit. The vials are then guided to the discharge unit in the conveyance end section and lifted upward by the support member of the discharge unit, thereby being discharged. Since the horizontal conveyance unit is provided at the bottom of the receiving unit, the capacity of the receiving unit is quite significant.

According to the present invention, it is possible to reliably discharge the vials by using the conveyance unit and the discharge unit. Further, since the horizontal conveyance unit is provided at the bottom of the receiving section, the bottom of the receiving unit is not tilted. Thus, compared to the conventional vial supply device, the capacity of the receiving unit is quite significant.

DESCRIPTION OF SYMBOLS

4 . . . vial,
101 . . . receiving section,
104 . . . horizontal endless belt,
105 . . . conveyance unit,
109 . . . vertical endless belt,
110 . . . support member, and
111 . . . discharge unit

DETAILED DESCRIPTION

Hereinafter, the embodiments of the present invention will be explained with reference to the accompanying drawings.

Figure 1:
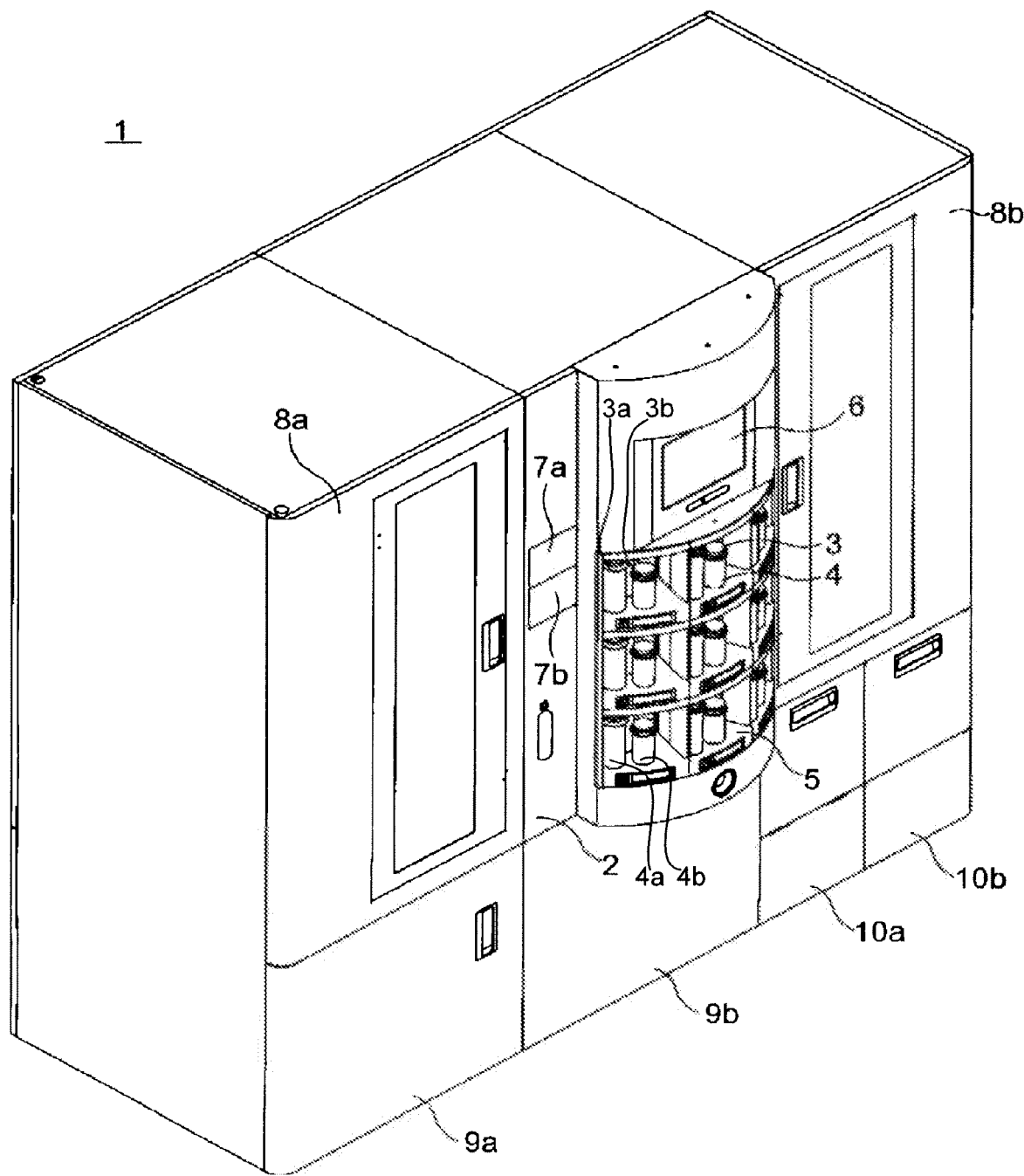
FIG. 1 is a perspective view of a tablet filling device according to the present invention.

FIG. 1 shows an exterior of a tablet filling device 1 according to an embodiment of the present invention. Nine extracting shelves 5 are placed in a center door 2, which is provided at a front center of the tablet filling device 1. Vials 4 filled with tablets and closed by a cap 3 are stacked from an inner side in the extracting shelves 5. The extracting shelves 5 are protruded forward and bent so as to easily extract the vials 4. An operation display screen 6 for displaying the required information by operating the tablet filling device 1 is provided at an upper direction of the extracting shelves 5. Cap inlets 7a and 7b for inputting big and small caps 3a and 3b are formed at a left side of the extracting shelf 5. Right and left doors 8a and 8b, which are opened and closed when attaching and detaching a tablet cassette 21 (not visible in FIG. 1), are provided at both sides of the center door 2. A door 9a for checking an inner device is provided at a lower direction of the left side door 8a. A closet 9b for checking the inner device is provided at a lower direction of the center door 2. Two doors 10a and 10b for inputting the big and small vials 4a and 4b are provided at a lower direction of the right side door 8b.

Figure 2:
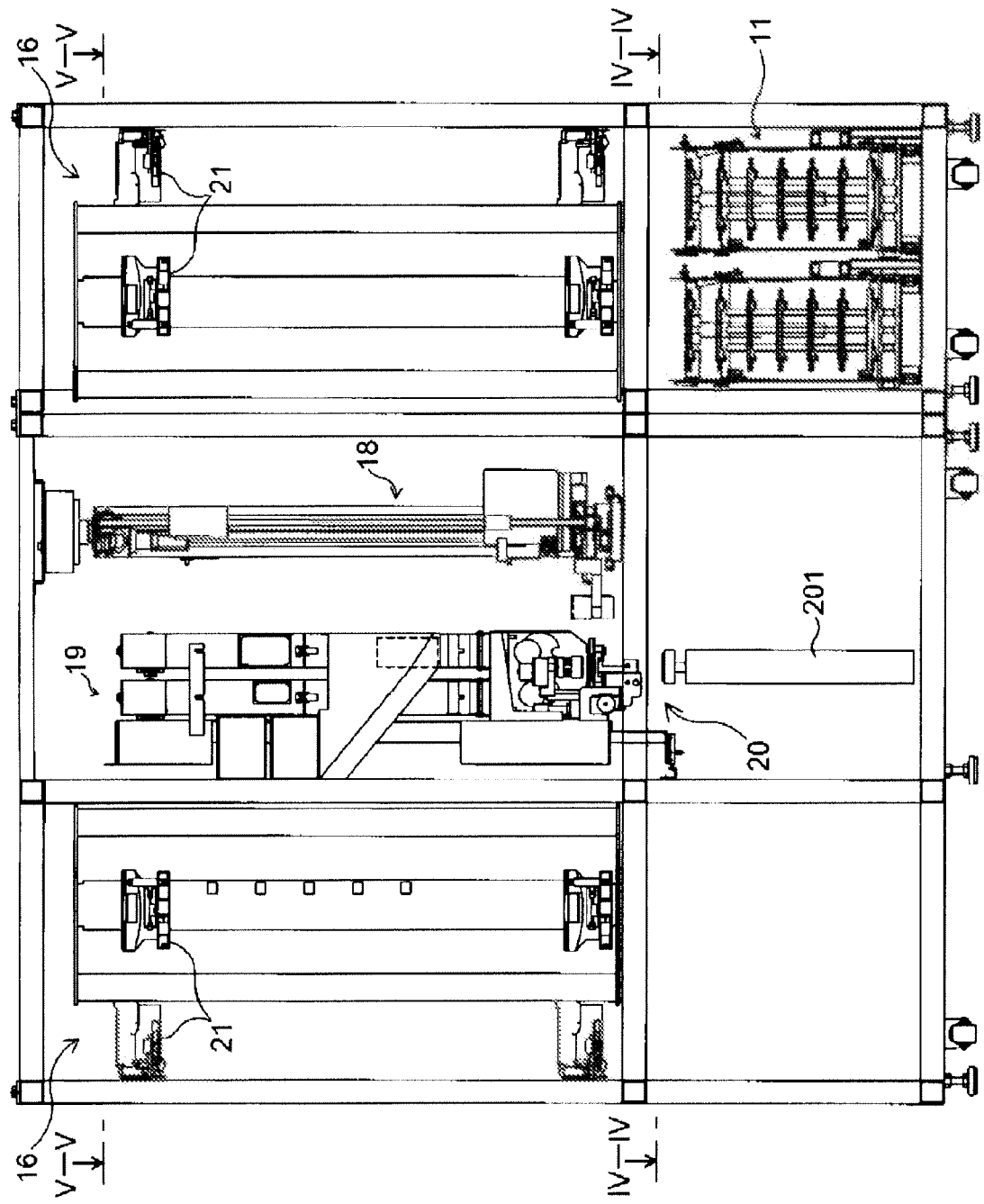
FIG. 2 is a front view illustrating the removal of a door of the tablet filling device.
Figure 3:
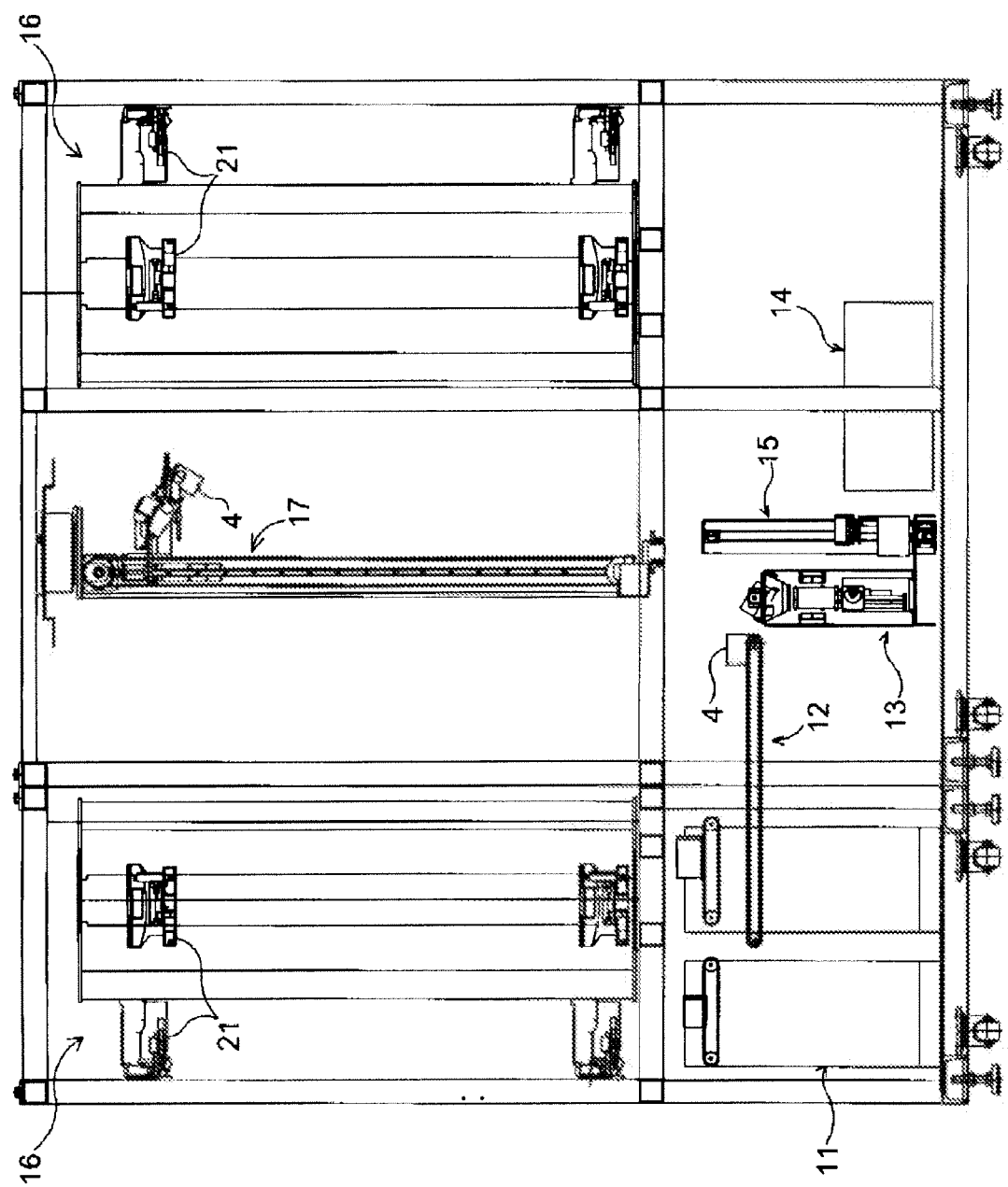
FIG. 3 is a rear view illustrating the removal of an exterior plate of the tablet filling device.
Figure 4:
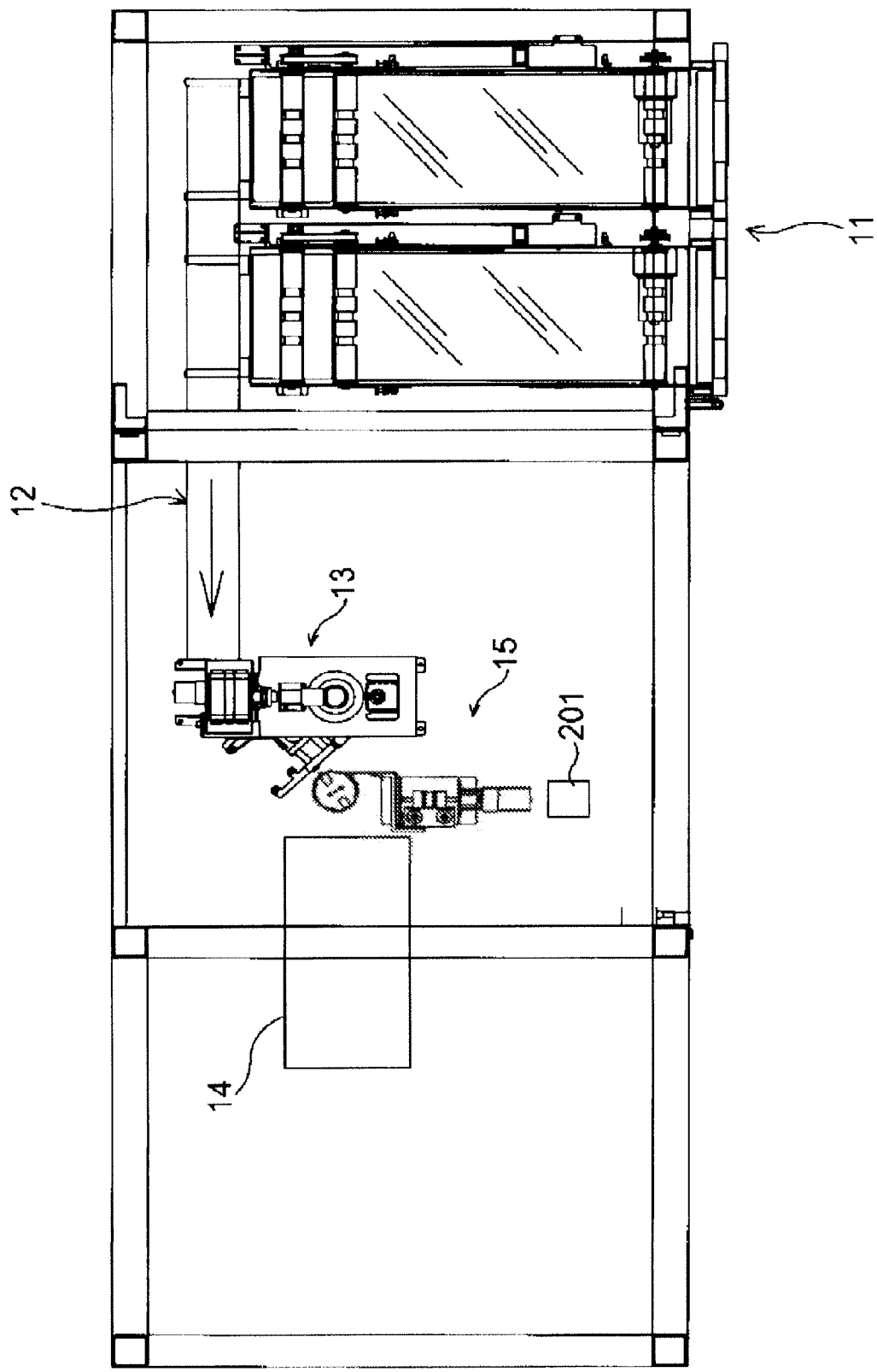
FIG. 4 is a cross-sectional view taken along the line IV-IV of FIG. 2.
Figure 5:
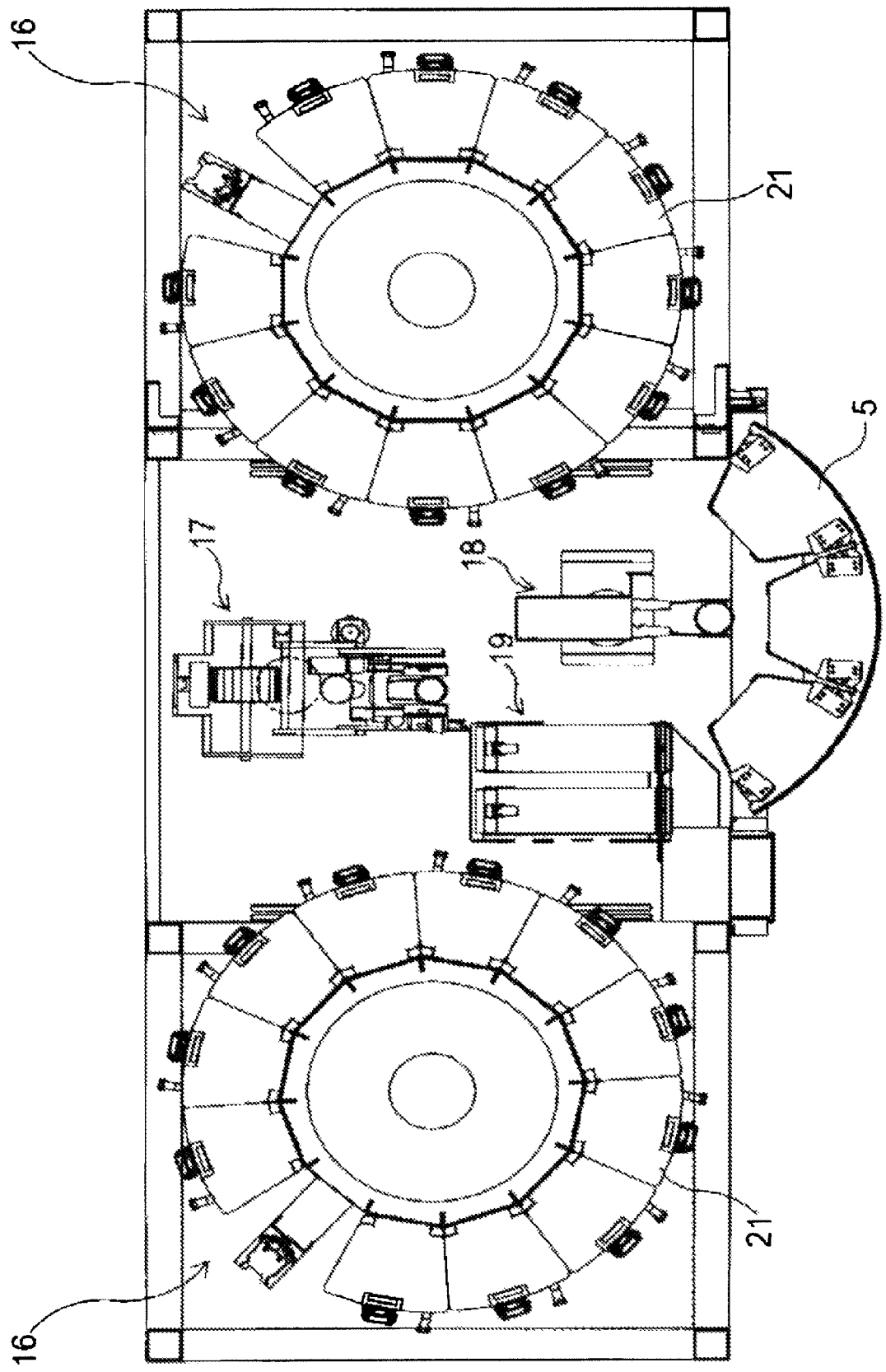
FIG. 5 is a cross-sectional view taken along the line V-V of FIG. 2.

FIG. 2 is a front view illustrating the removal of the door 5 of the tablet filling device. FIG. 3 is a rear view illustrating the removal of an exterior plate (not illustrated) of the tablet filling device. FIG. 4 is a cross-sectional view taken along the line IV-IV of FIG. 2. FIG. 5 is a cross-sectional view taken along the line V-V of FIG. 2. As shown in the above figures, the tablet filling device 1 comprises two vial supply units 11, a vial conveyance belt 12, a vial conveyance arm unit 13, a labeling unit 14, a vial lift unit 15, two tablet supply units 16, a first vial delivery arm unit 17, a second vial delivery arm unit 18, a cap supply unit 19 and a capping unit 20.

Two vial supply units 11 are provided at a right lower portion (when viewed from the front). The vial supply units 11 store the big and small vials 4, and extract and supply the vials 4 required for receiving the tablets according to prescription.

The vial conveyance belt 12 is provided at a rear of the vial supply unit 11 and horizontally extended toward the center, thereby conveying the vials 4 supplied from the vial supply unit 11 to the vial conveyance arm unit 13.

The vial conveyance arm unit 13 is positioned at an end section of the vial conveyance belt 12 and changes a direction of the vials 4 conveyed from the vial conveyance belt 12 so as to be opened upward. Thereafter, it conveys the vials 4 to the labeling unit 14 and the vial lift unit 15.

The labeling unit 14 is positioned at a left lower portion (when viewed from the front) and attaches a label to the vials 4 conveyed from the vial conveyance arm unit 13.

The vial lift unit 15 is positioned between the labeling unit 14 and the vial conveyance arm unit 13. The vial lift unit 15 lifts the vials 4 labeled by the labeling unit 14 to thereby guide them to the first vial delivery arm unit 17.

The tablet supply units 16 are positioned at right and left sides (when viewed from the front). Each tablet supply unit 16 has a plurality of tablet feeders 500 provided around a rotatable drum 501 and discharges the tablets according to prescriptions from the tablet feeder, thereby supplying the tablets to the vials 4 held in the first vial delivery arm unit.

The first vial delivery arm unit 17 is positioned at a rear side and between the two tablet supply units 16. The first vial delivery arm unit 17 receives the vials 4 from the vial lift unit 15 and moves to any tablet feeder 500 of one of the tablet supply units 16. It then guides the vials 4 to the second vial delivery arm unit 18 when the tablets according to the prescriptions are filled.

The second vial delivery arm unit 18 is positioned at a front side and between the two tablet supply units 16. The second vial delivery arm unit 18 guides the vials 4 received from the first vial delivery arm unit 17 to the capping unit 19, thereby capping the vials 4 and then stacking the capped vials 4 in the extracting shelf 5.

The cap supply unit 19 is positioned at a left side (when viewed from the front) of the second vial delivery arm unit 18. The cap supply unit 19 receives two types of caps 3, i.e., big and small caps 3 used for closing the vials 4, and supplies any one of the caps 3 one by one.

The capping unit 20 is positioned at a lower direction of the cap supply unit 19 provided with the caps 3 supplied from the cap supply unit 19 to the vials 4 received from the second vial delivery arm unit 18.

Hereinafter, the vial supply unit 11, the vial conveyance belt 12, the vial conveyance arm unit 13, the labeling unit 14 and the vial lift unit 15 (i.e., the vial supply device of the present invention) will be explained in detail.

<Vial Supply Unit>

Figure 6:
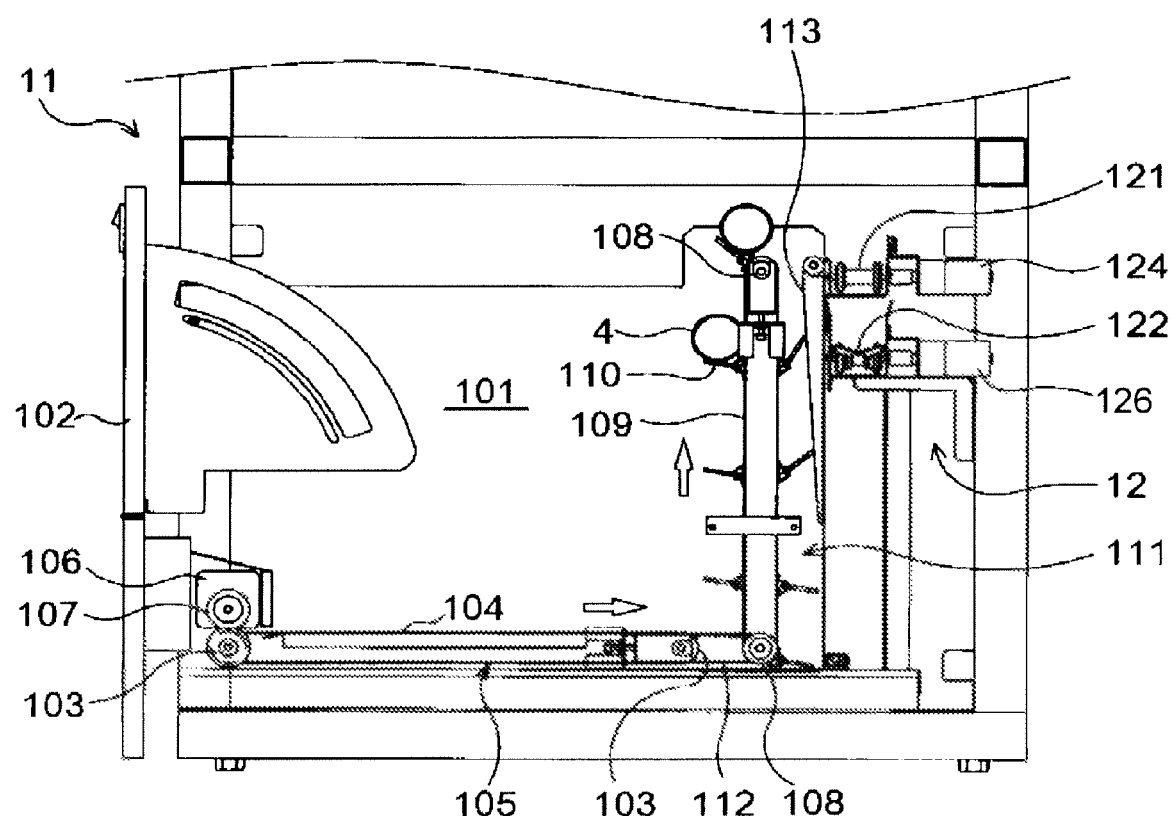
FIG. 6 is a cross-sectional view of a vial supply unit according to the present invention.

FIG. 6 shows an inner structure of the vial supply unit 11. As shown in FIG. 2, two vial supply units 11 are provided for the big-sized vials 4a and the small-sized vials 4b. However, since these vial supply units have the same structure, only one of them will be explained.

The vial supply unit 11 has a receiving section 101 in a rectangular box shape wherein an upper direction is opened. A door 102 is provided at a front side of the receiving section 101. The vials 4 can be randomly inputted into the inside by opening the door 102. A conveyance unit 105 is provided around a bottom wall of the receiving section 101. The conveyance unit 105 has a horizontal endless belt 104 extended between two rollers 103. The horizontal endless belt 104 of the conveyance unit 105 is set so as to be movable in a horizontal direction from the front side to the rear side by driving the roller 103 at a start end side by a motor 106 via a gear 107. A discharge unit 111 is provided around a wall at the rear side of the receiving section 101. The discharge unit 111 has a vertical endless belt 109 extended between two rollers 108 provided with support members 110 at predetermined intervals. The support members 110 are provided so as to be vertically protruded from a surface of the vertical endless belt 109 and set to be tilted downward to a conveyance direction when a load equal to or greater than a predetermined value is exerted. A conveyance start section of the discharge unit 111 is close to a conveyance end section of the conveyance unit 105. The vertical endless belt 109 of the discharge unit 111 is set to be movable in a vertical direction from a lower direction to an upper direction by connecting the roller 108 at the start section side with the roller 103 at the end section side of the conveyance unit 105 by a belt 112.

A tilt plate 113 is located at a rear side of the discharge unit 111, i.e., a side where the vertical endless belt 109 is lowered. A gap formed between an upper portion of the tilt plate 113 and the vertical endless belt 109 is smaller than a protrusion size of the support member 110 and identical to an outer diameter of the vial 4. A gap formed between a lower portion of the tilt plate 113 and the vertical endless belt 109 is greater than the gap formed between the upper portion of the tilt plate 113 and the vertical endless belt 109 so as to be approximately identical to the protrusion size of the support member 110.

In the vial supply unit 11 mentioned above, the vials 4 received in the receiving section 101 are conveyed in a horizontal direction by the vertical endless belt 104 of the conveyance unit 105 toward the discharge unit 111. By doing so, they can be horizontally supported at the support member 110 of the vertical endless belt 109 of the discharge unit 111. Thereafter, the vials 4 are lifted upward so as to be discharged from the upper portion of the receiving section 101 to the outside. Since the gap formed between the upper portion of the tilt plate 113 and the vertical endless belt 109 is narrower than the vials 4, the vials 4 are not dropped. Further, the support member 110 discharging the vials 4 contacts the tilt plate 113 and moves downward while being tilted. Thus, the support member 110 returns to an original state when the support member 110 is disposed away from the tilt plate 113. Since the bottom of the receiving section 101 is provided with the vertical endless belt 104, the capacity of the receiving section 101 is quite large compared to the conventional vial supply device with the tilted bottom. Thus, it is possible to receive a large number of vials 4. Further, although few vials 4 may remain, since the vials 4 are horizontally conveyed by the horizontal endless belt 104 toward the discharge unit 111, the vials 4 are horizontally supported at the support member 110 of the discharge unit 111. As such, it is possible to reliably discharge and supply the vials 4.

<Vial Conveyance Belt>

Figure 7:
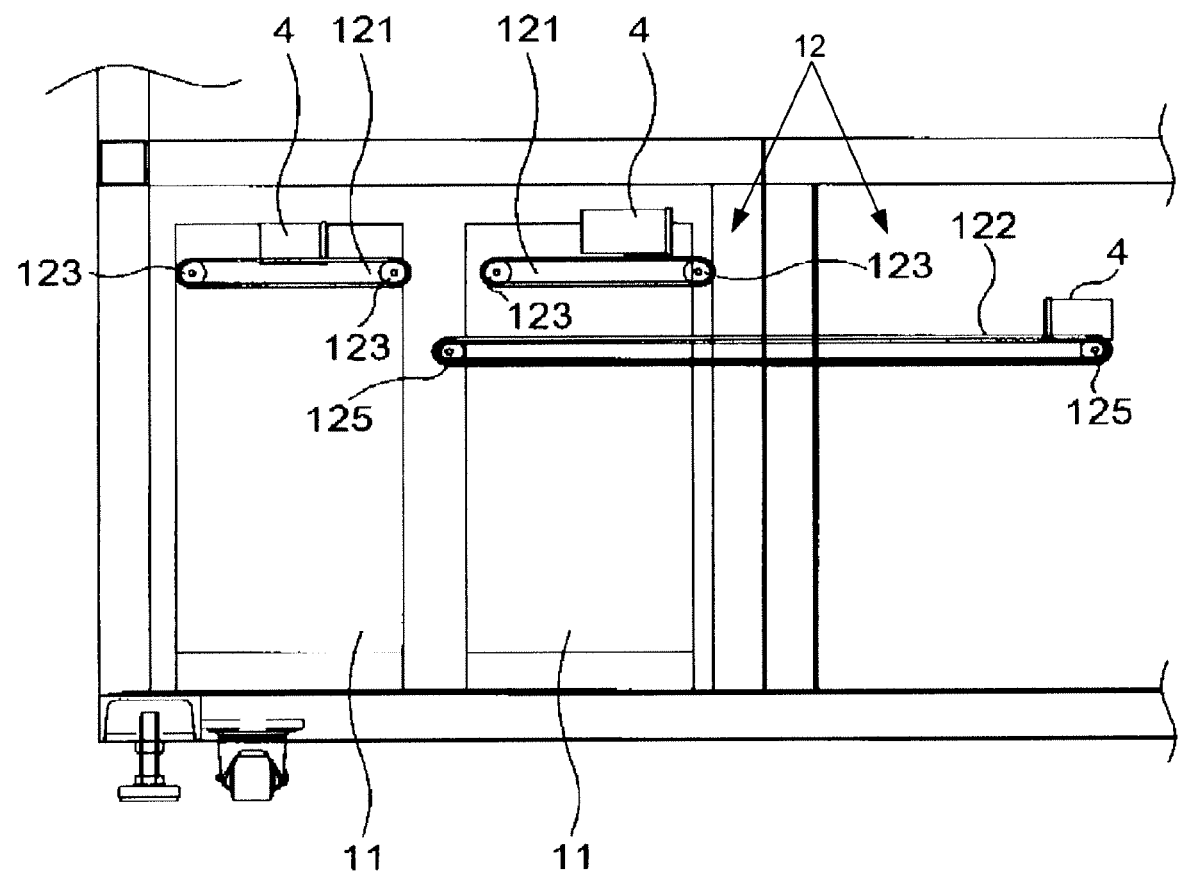
FIG. 7 is a front view of a vial conveyance belt according to the present invention.

FIG. 7 shows the vial conveyance belt 12. The vial conveyance belt 12 includes a short belt 121 provided at a rear upper portion of the receiving section 101 of the vial supply unit 11 and a long belt 122 provided at a lower direction of the short belt 121. The short belt 121 is horizontally extended between two rollers 123 and can be driven by a motor 124 shown in FIG. 6. The long belt 122 is also horizontally extended between two rollers 125 and can be driven by a motor 126 shown in FIG. 6.

The vials 4 discharged from the receiving section 101 of each vial supply unit 11 by the vial conveyance belt 12 are dropped on the short belt 121. Thereafter, they are conveyed and continuously dropped on the long belt 122 so as to be conveyed toward a center of the device.

<Vial Conveyance Arm Unit>

Figure 8:
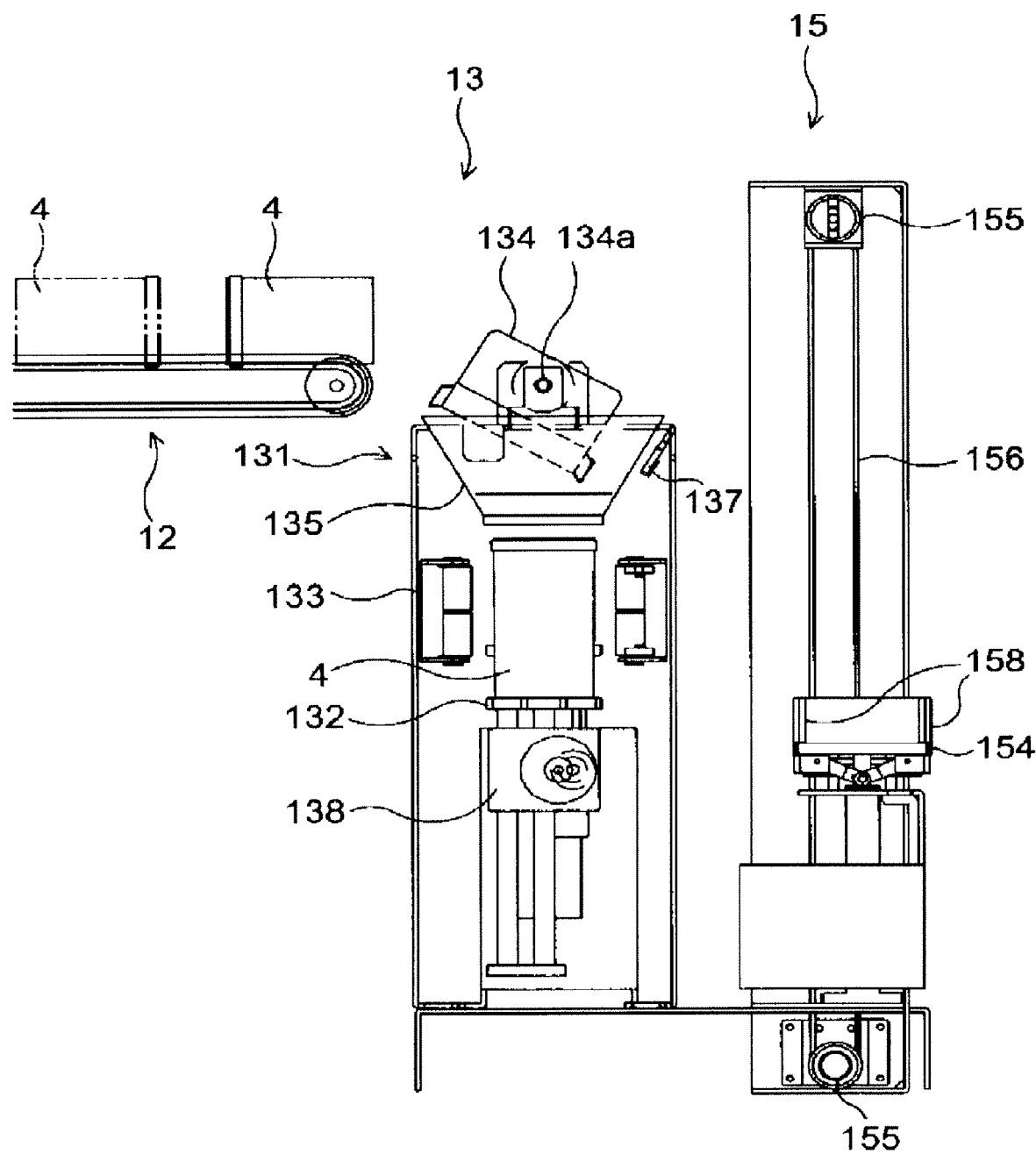
FIG. 8 is a front view of a vial conveyance arm unit and a vial lift unit according to the present invention.
Figure 9:
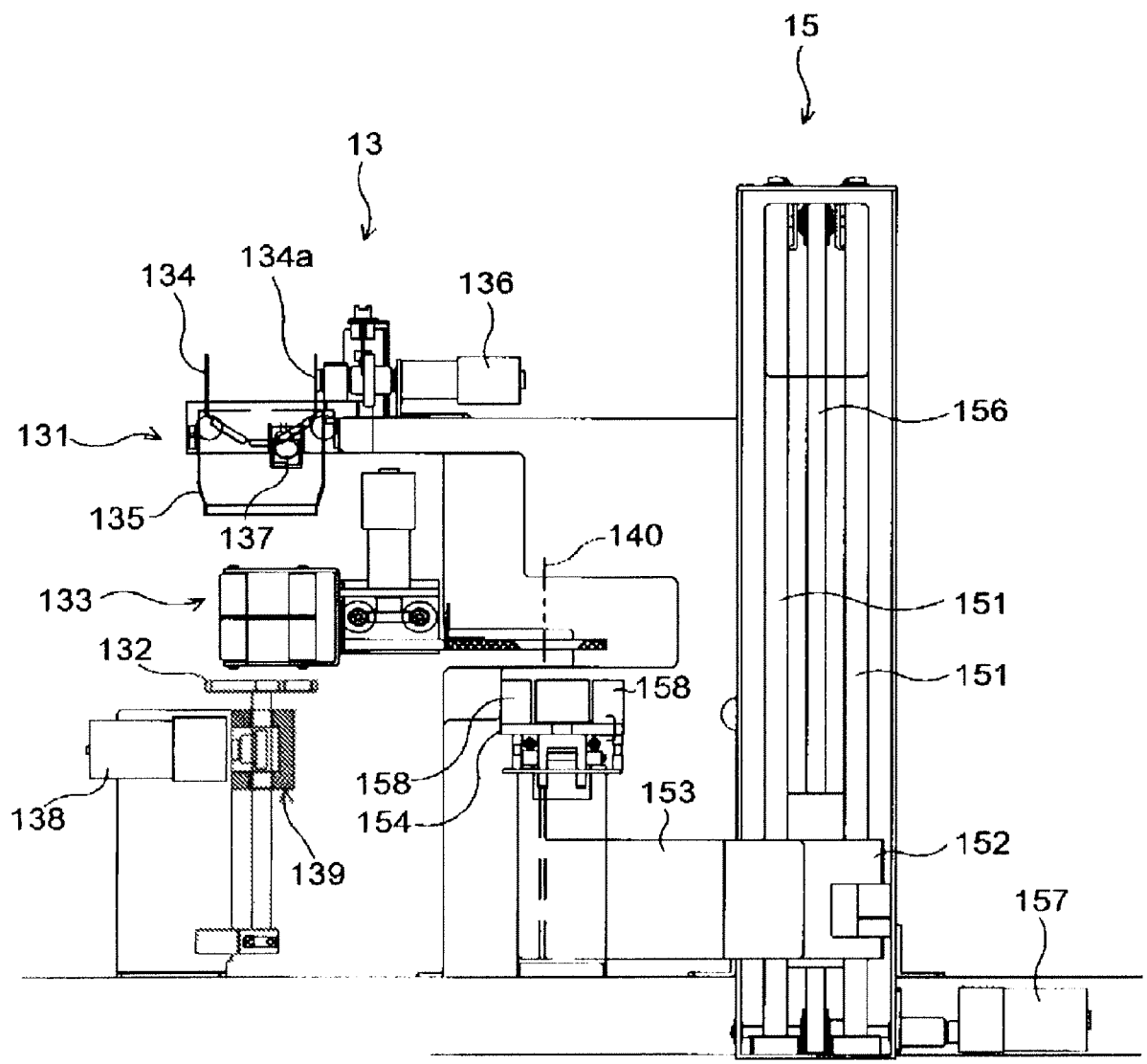
FIG. 9 is a side view of the vial conveyance arm unit and the vial lift unit.
Figure 10:
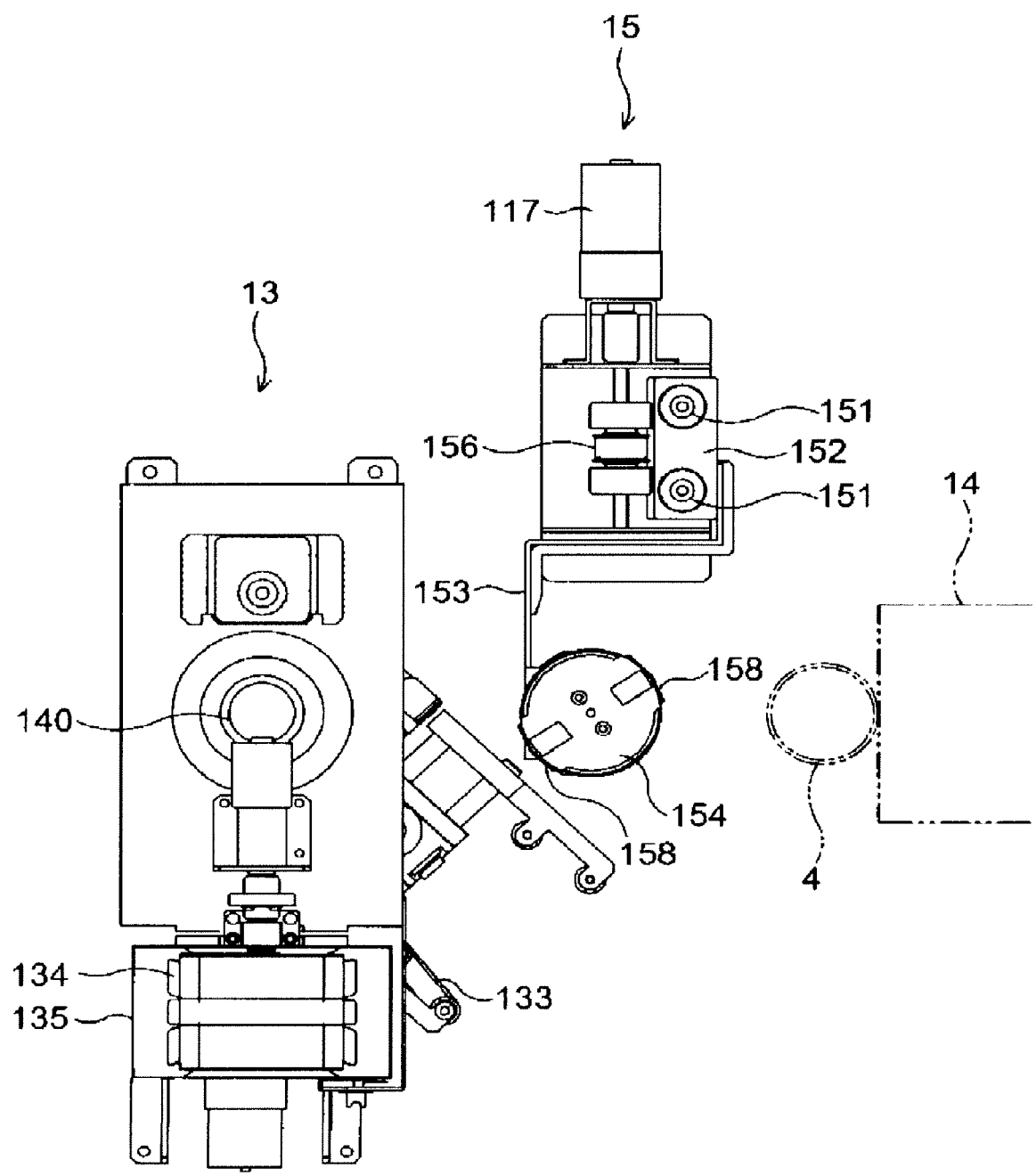
FIG. 10 is a plan view of the vial conveyance arm unit and the vial lift unit.

FIGS. 8, 9 and 10 are front, side and plan views of the vial conveyance arm unit 13 and the vial lift unit 15, respectively. The vial conveyance arm unit 13 includes a direction changing section 131, a rest 132 and an arm 133.

The direction changing section 131 includes a trough 134 and a hopper 135. The trough 134 is rotatably supported at a central side surface around a shaft 134a. The trough 134 is set to be rotated among a tilted general position such that the trough 134 can receive the vials 4 conveyed by the vial conveyance belt 12 by driving a motor 136, a first operation position where the trough 134 is rotated along a clockwise direction in FIG. 8 (so that a front end in a direction of receiving the vials 4 faces downward), and a second operation position where the trough 134 is rotated along a counterclockwise direction in FIG. 8 (so that a rear end in a direction of receiving the vials 4 faces downward). The hopper 135 has a pyramid shape with upper and lower ends opened. Further, the trough 134 is provided at an opening portion of the upper end. A sensor 137 for detecting a direction of the vials 4 is provided at an inner surface of the hopper 135 opposite to the front end of the trough 134. The sensor 137 is preferably a touch type such as a limit switch which is switched on when the vials 4 are conveyed having the lower portion at front and switched off when the vials 4 are conveyed having the opening portion at front. However, it should be noted herein that the sensor 137 may be a non-touch type such as a photo sensor. The vials 4 conveyed to the trough 134 in the general position by the vial conveyance belt 12 are received in the direction changing section 131 and bumped with an inner wall of the hopper 135 to thereby be stopped. When the vials 4 are conveyed having the lower portion at front as indicated with a solid line in FIG. 8, the sensor 137 is switched on and the trough 134 is thus rotated in a clockwise direction to the first operation position based on a signal of the sensor 137. As such, the vials 4 form the lower portion to be downward. Further, when the vials 4 are conveyed having the opening portion at front as indicated with a two-dot chain line in FIG. 8, the sensor 137 is switched off and the trough 134 is thus rotated in a counterclockwise direction to the second operation position based on the signal of the sensor 137. By doing so, the vials 4 form the lower portion to be downward. Accordingly, the direction of the vials 4 is changed such that the lower portion is always downward regardless of the direction of the vials 4 being conveyed.

The rest 132 is positioned at a lower direction of the hopper 135 of the direction changing section 131 and receives the vials 4 passed through the hopper 135. The rest 132 can be lifted by a motor 138 via a rack and pinion mechanism 139. That is, when the vials 4 are received in the trough 134 of the direction changing section 131, the rest 132 is lifted to the opening portion of the lower end of the hopper 135 and receives the vials 4, the direction of which is changed by the direction changing section 131. The rest 132 is then lowered and stopped such that the opening portion forms the same position regardless of the length of the vials 4.

The arm 133 serves to hold the vials 4 received in the rest 132 from both sides. The arm 133 can be swung, advanced and retreated in a horizontal direction around a shaft 140. That is, as shown in FIG. 10, the arm 133 holds the vials 4 at a first position in a downward direction of the direction changing section 131 and moves to a second position swung by 90° in a counterclockwise direction. Then, the arm 133 is advanced to oppose the vials 4 to the labeling device 14. When a label is attached to the vials 4, the arm 133 is retreated to release the vials 4 and guide them to the vial lift unit 15. Then, the arm 133 returns to the first position through being swung by 90° in a counterclockwise direction.

<Labeling Unit>

The labeling unit 14 serves to print the predetermined information on a label and attach the label to the vials 14. Since the labeling unit 14 is disclosed in Japanese Laid-Open Patent Publication No. (Hei) 2005-212878, an explanation thereof will be omitted herein.

<Vial Lift Unit>

The vial lift unit 15 includes a base 152 which may be lifted along a vertically provided guide shaft 151. A rest 154 in a thin cup shape is provided at a bracket 153 extended in a horizontal direction from the base 152. The base 152 is fixed on a belt 156 extended between two upper and lower rollers 155. It is set to be lifted between a downward direction and an upward direction through driving the lower roller 155 by a motor 157. A sensor (not shown) for detecting the stacking of the vials 4 is provided at the rest 154. Further, a pair of grabbing pieces 158 is provided at a periphery of the rest 154 in order to grab the stacked vials 4. The rest 154 is generally positioned at a lower direction. Also, when the rest 154 receives the vials 4 attached with the label from the vial conveyance arm unit 13 at this position, the grabbing pieces 158 are closed to thereby grab the vials 4. Next, when the rest 154 is lifted to an upper position, the grabbing pieces 158 are opened to release the vials 4 and guide them to the first vial delivery unit 17. Thereafter, the rest 154 is returned to the lower position.

As such, the vials 4 are conveyed to the tablet feeder 21 of the tablet supply unit 16 by the first vial delivery arm unit 17 and filled with the tablets. Then, the vials 4 are guided to the capping unit 20 by the second vial delivery unit 18 and closed by the cap 3 supplied by the cap supply unit 19. Thereafter, the vials 4 are stacked on the extracting shelf by the second vial delivery arm unit 18.

Although various embodiments of the present invention are described above, it will be evident to one skilled in the art that various changes and modifications may be made without departing from the invention. It is intended in the appended claims to cover all such changes and modifications that fall within the true spirit and scope of the invention.

What is claimed is:

1. A vial supply device for supplying empty vials one at a time, the vial supply device comprising:
   a receiving section for receiving a plurality of empty vials, the receiving section having a bottom wall;
   a horizontal conveyor belt located on the bottom wall of the receiving section, the horizontal conveyor belt being configured to horizontally convey an empty vial to a first position; and
   a vertical conveyor belt comprising a plurality of support members located at predetermined intervals along the vertical conveyor belt, the vertical conveyor belt being located in the receiving section, each support member being configured to lift the empty vial upward from the first position and to discharge the lifted empty vial to a second position,
   wherein a conveyance end section of the horizontal conveyor belt and a conveyance start section of the vertical conveyor belt are adjacent to each other.

2. The vial supply device of claim 1, wherein the receiving section includes a top wall, wherein the top wall, the bottom wall, and the horizontal conveyor belt are all substantially parallel to one another.

3. The vial supply device of claim 1, further comprising a tilt plate having an upper portion spaced apart from the vertical conveyor belt by a distance equal to an outer diameter of the empty vial, and a lower portion spaced apart from the vertical conveyor belt by a distance approximately equal to a protrusion size of one of the support members.

4. The vial supply device of claim 3, wherein the upper portion of the tilt plate is configured to prevent the empty vial from being dropped during the discharge and to vertically tilt the support member upon which that vial was supported, and wherein the lower portion of the tilt plate is configured to return that support member to a tilt suitable for supporting another empty vial to be lifted.

5. The vial supply device of claim 1, wherein the receiving section is configured to receive empty vials having random orientations.

6. The vial supply device of claim 1, further comprising a vial conveyance belt configured to convey one empty vial at a time from the second position to a vial conveyance arm unit, the vial conveyance arm unit comprising a direction changing section configured to vertically orient one empty vial at a time.

7. The vial supply device of claim 6, wherein the direction changing section comprises a trough, a hopper, and a sensor,
wherein the trough is configured to receive one empty vial at a time from the vial conveyance belt;
wherein the sensor is configured to detect whether the empty vial received by the trough has a first orientation or a second orientation;
wherein the trough is configured to rotate the empty vial in a first direction if the sensor detects that the empty vial has the first orientation, and to rotate the empty vial in a second direction if the sensor detects that the empty vial has the second orientation; and
wherein the hopper is configured to orient the rotated empty vial vertically with a closed portion of the empty vial downward.

8. The vial supply device of claim 7, wherein the sensor comprises a touch type sensor.

9. The vial supply device of claim 8, wherein the touch-type sensor comprises a limit switch configured to switch on if the vial has the first orientation, and to switch off if the vial has the second orientation.

10. The vial supply device of claim 7, wherein the sensor comprises a photo sensor.

11. The vial supply device of claim 7, further comprising a rest to receive the vertically oriented empty vial.

12. The vial supply device of claim 11, wherein the vial conveyance arm unit further comprises an arm configured to convey the received empty vial to a vial lift unit.

13. The vial supply device of claim 12, wherein the arm is configured to convey the received empty vial to a labeling unit for labeling before conveying the empty vial to the vial lift unit.

14. The vial supply device of claim 12, wherein the vial lift unit is configured to grab the empty vial, to lift the grabbed empty vial, and to release the lifted empty vial to a vial delivery arm unit, the vial delivery arm unit being configured to convey the empty vial to a tablet filling section for filling with tablets.

15. A method of supplying empty vials one at a time, the method comprising:
receiving a plurality of empty vials by a receiving section having a bottom wall;
horizontally conveying an empty vial to a first position with a horizontal conveyor belt located on the bottom wall of the receiving section;
supporting the empty vial at the first position with a support member, wherein the support member is one of a plurality of support members coupled to a vertical conveyor belt, wherein the vertical conveyor belt is located in the receiving section and a conveyance end section of the horizontal conveyor belt and a conveyance start section of the vertical conveyor belt are adjacent to each other;
lifting the support member to lift the empty vial from the first position; and
discharging the lifted empty vial to a second position.

16. The method of claim 15, wherein the plurality of empty vials have random orientations and are received in the receiving section.

17. The method of claim 16, wherein the receiving section includes a top wall, and wherein the horizontal conveyor belt is parallel to the top wall and to the bottom wall.

18. The method of claim 15, further comprising:
receiving the empty vial in a trough;
detecting whether the empty vial in the trough has a first orientation or a second orientation;
if the empty vial in the trough has the first orientation, rotating the trough in a first direction to rotate the empty vial in the first direction;
if the empty vial in the trough has a second orientation, rotating the trough in a second direction to rotate the empty vial in the second direction; and
orienting the rotated empty vial vertically with a closed portion of the empty vial downward.

19. The method of claim 18, further comprising labeling the vertically oriented empty vial and then conveying the labeled empty vial to a vial lift unit.

20. The method of claim 19, wherein the vial lift unit grabs the empty vial, lifts the grabbed empty vial, and releases the lifted empty vial to a vial delivery arm unit,
wherein the vial delivery arm unit conveys the empty vial to a tablet filling section for filling with tablets.

* * * * *